US 9,042,605 B2

(12) United States Patent  
Gossweiler et al.

(10) Patent No.: US 9,042,605 B2  
(45) Date of Patent: May 26, 2015

(54) DETERMINING A VIEWING DISTANCE FOR A COMPUTING DEVICE

(71) Applicant: Google Inc., Mountain View, CA (US)

(72) Inventors: Richard Gossweiler, Sunnyvale, CA (US); Gregory Sean Corrado, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 120 days.

(21) Appl. No.: 13/768,257

(22) Filed: Feb. 15, 2013

(65) Prior Publication Data

US 2014/0233806 A1   Aug. 21, 2014

(51) Int. Cl.
*G06K 9/00* (2006.01)
*G01C 11/04* (2006.01)

(52) U.S. Cl.
CPC .................................... *G01C 11/04* (2013.01)

(58) Field of Classification Search
None
See application file for complete search history.

(56) References Cited

U.S. PATENT DOCUMENTS

| 4,944,585 | A | 7/1990 | Mizuno |
| 8,743,099 | B2 * | 6/2014 | Lin ................................ 345/207 |
| 2005/0068495 | A1 | 3/2005 | Jojiki |
| 2008/0049020 | A1 | 2/2008 | Gusler et al. |
| 2008/0294278 | A1 | 11/2008 | Borgeson et al. |
| 2009/0201516 | A1 | 8/2009 | Takahashi et al. |
| 2009/0268888 | A1 | 10/2009 | Hsu et al. |
| 2011/0267338 | A1 | 11/2011 | Nam et al. |
| 2012/0287163 | A1 * | 11/2012 | Djavaherian ................... 345/667 |
| 2013/0135511 | A1 * | 5/2013 | Yamada et al. ........... 348/333.12 |
| 2013/0195204 | A1 * | 8/2013 | Reznik et al. ............. 375/240.26 |
| 2014/0118240 | A1 * | 5/2014 | Pais .............................. 345/156 |
| 2014/0118354 | A1 * | 5/2014 | Pais et al. ..................... 345/428 |
| 2014/0132499 | A1 * | 5/2014 | Schwesinger et al. ........ 345/156 |

* cited by examiner

*Primary Examiner* — Anand Bhatnagar
*Assistant Examiner* — Soo Park
(74) *Attorney, Agent, or Firm* — Morris & Kamlay LLP

(57) ABSTRACT

A method, computer readable storage device, and apparatus for determining the distance a computing device is located from a user's face. An image of an individual is obtained. A first pupil location and a second pupil location are identified based on the obtained image. A first distance between the identified first and second pupil location is determined. A second distance between the individual and the computing device is determined based on the determined first distance between the identified first and second pupil locations.

15 Claims, 3 Drawing Sheets

DETERMINING A VIEWING DISTANCE FOR A COMPUTING DEVICE

BACKGROUND

Mobile computing devices, such as cell phones, smartphones, and tablet devices, increasingly utilize interactive displays that may be altered based on the position of a user relative to the mobile computing device. Knowing the distance between the user's head and the mobile computing device can be a powerful input mechanism. The mobile computing device can utilize the distance between the user's head and the mobile computing device to optimize the user experience. For example, when the user is far away, fonts can be made bigger to render the text more readable. The display also may automatically adapt to changes in the distance between the user's head and the mobile computing device based on gestures such as the user moving closer to the mobile computing device.

To provide this type of optimized viewing, the mobile computing device must be able to determine the distance between the user's head and the mobile computing device. The distance between the user's head and the mobile computing device can be determined based on the size of the user's head and their arm length. These values, however, are not generally known by the mobile computing device, would require additional user input, and would prevent optimal use of the mobile computing device by multiple individuals for whom the values may differ.

SUMMARY

A method includes obtaining, at a mobile computing device, an image of an individual. A first pupil location and a second pupil location are identified based on the obtained image. A first distance between the identified first and second pupil location is determined A second distance between the individual and the mobile computing device is determined based on the determined first distance between the identified first and second pupil locations.

A computer readable storage device having stored thereon instructions for determining the viewing distance for a mobile computing device comprising machine executable code which, when executed by a processor, causes the processor to perform steps including obtaining an image of an individual. A first pupil location and a second pupil location are identified based on the obtained image. A first distance between the identified first and second pupil location is determined A second distance between the individual and the device is determined based on the determined first distance between the identified first and second pupil locations.

An apparatus comprising a memory coupled to a processor configured to execute programmed instructions stored in the memory including obtaining an image of an individual. A first pupil location and a second pupil location are identified based on the obtained image. A first distance between the identified first and second pupil location is determined. A second distance between the individual and the apparatus is determined based on the determined first distance between the identified first and second pupil locations.

This technology provides a number of advantages including providing effective methods and devices for determining a viewing distance for a mobile computing device. With this technology, a mobile computing device may determine the viewing distance based on a determined instantaneous apparent distance between the user's pupils in an image obtained by a user-facing camera of the mobile computing device. The instantaneous interpupilary distance may then be utilized to determine the viewing distance without explicit user calibration and/or a need to enter user-related information. The viewing distance may then be used to optimize display conditions and the user experience. Further, the technology is cost effective as it may be adapted to determine the viewing distance using the mobile computing device camera, which is already provided on many mobile devices.

DETAILED DESCRIPTION

Figure 1:
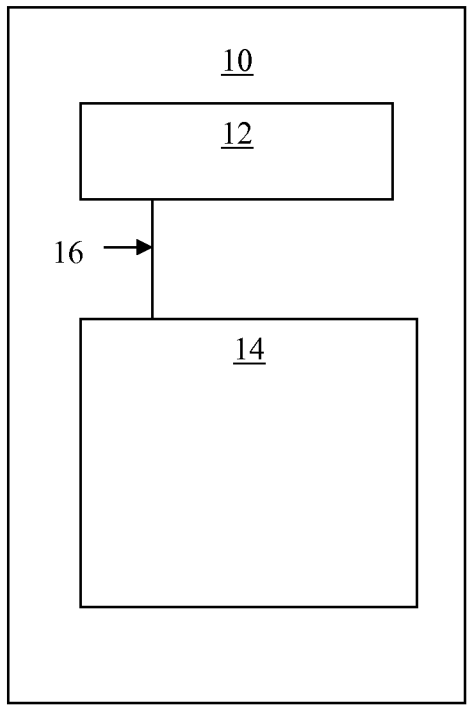
FIG. 1 is a mobile computing device adapted to determine the distance a viewing distance for the mobile computing device.

A mobile computing device 10 adapted to determine the distance the mobile computing device 10 is located from a user's head is illustrated in FIG. 1. Mobile computing device 10 may be a be a mobile and/or smart phone, although the computing device can comprise other types and numbers of mobile devices, such as a tablet computing device, PDA, minicomputer, and laptop computing device by way of example. Although the present invention is described in relation to mobile computing device 10, it is to be understood that the present invention may be incorporated in any suitable computing device such as a desktop computer, smart television, video game system, or any other computing device. This technology provides a number of advantages including providing effective methods and devices for determining a viewing distance for the mobile computing device 10 to optimize display conditions.

Referring more specifically to FIG. 1, the mobile computing device 10 may include a central processing unit (CPU) or processor 12 and a memory 14, which are coupled together by a bus 16 or other link, although the computing device 10 may contain other numbers and types of devices, components, and elements in other configurations. The processor 12 in the mobile computing device 10 may execute a program of stored instructions for one or more aspects of the present technology as described and illustrated by way of examples herein, although other types and numbers of processing devices and logic could be used and the processor 12 could execute other numbers and types of programmed instructions.

The memory 14 in the mobile computing device 10 may store the programmed instructions for one or more aspects of the present technology as described and illustrated herein, although some or all of the programmed instructions could be stored and executed elsewhere. A variety of different types of memory storage devices, such as random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 12, can be used for the memory 14.

Figure 2:
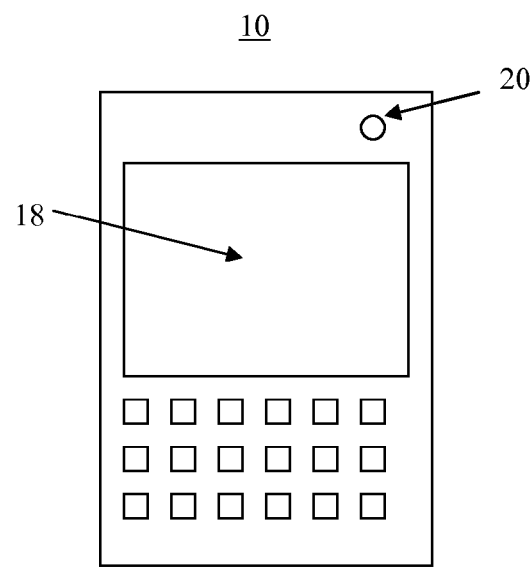
FIG. 2 is an external view of the mobile computing device of FIG. 1.

Referring to FIG. 2, the mobile computing device 10 may further include a display screen 18 and a camera 20. The display screen 18 may display content such as text, videos, games, and icons, although other types of content may be displayed on the display screen 18. The camera 20 may be oriented such that the camera 20 may obtain an image of an individual while the individual views the display screen 18.

Although an example of the computing device 10 is described herein, the present invention can be implemented on any suitable computer system or computing device. It is to be understood that the device and system of the example described herein is for example purposes, as many variations of the specific hardware and software used to implement the example are possible, as will be appreciated by those skilled in the relevant art(s).

The invention may also be embodied as computer readable storage device having instructions stored thereon for one or more aspects of the present technology as described and illustrated by way of the examples herein, which when executed by a processor, cause the processor to carry out the steps necessary to implement the methods of the examples, as described and illustrated herein. By way of example, the computer readable storage device may comprise a computer readable storage medium having instructions stored thereon for one or more aspects of the present technology as described and illustrated by way of the examples herein, which when executed by a processor, cause the processor to carry out the steps necessary to implement the methods of the examples, as described and illustrated herein.

Figure 3:
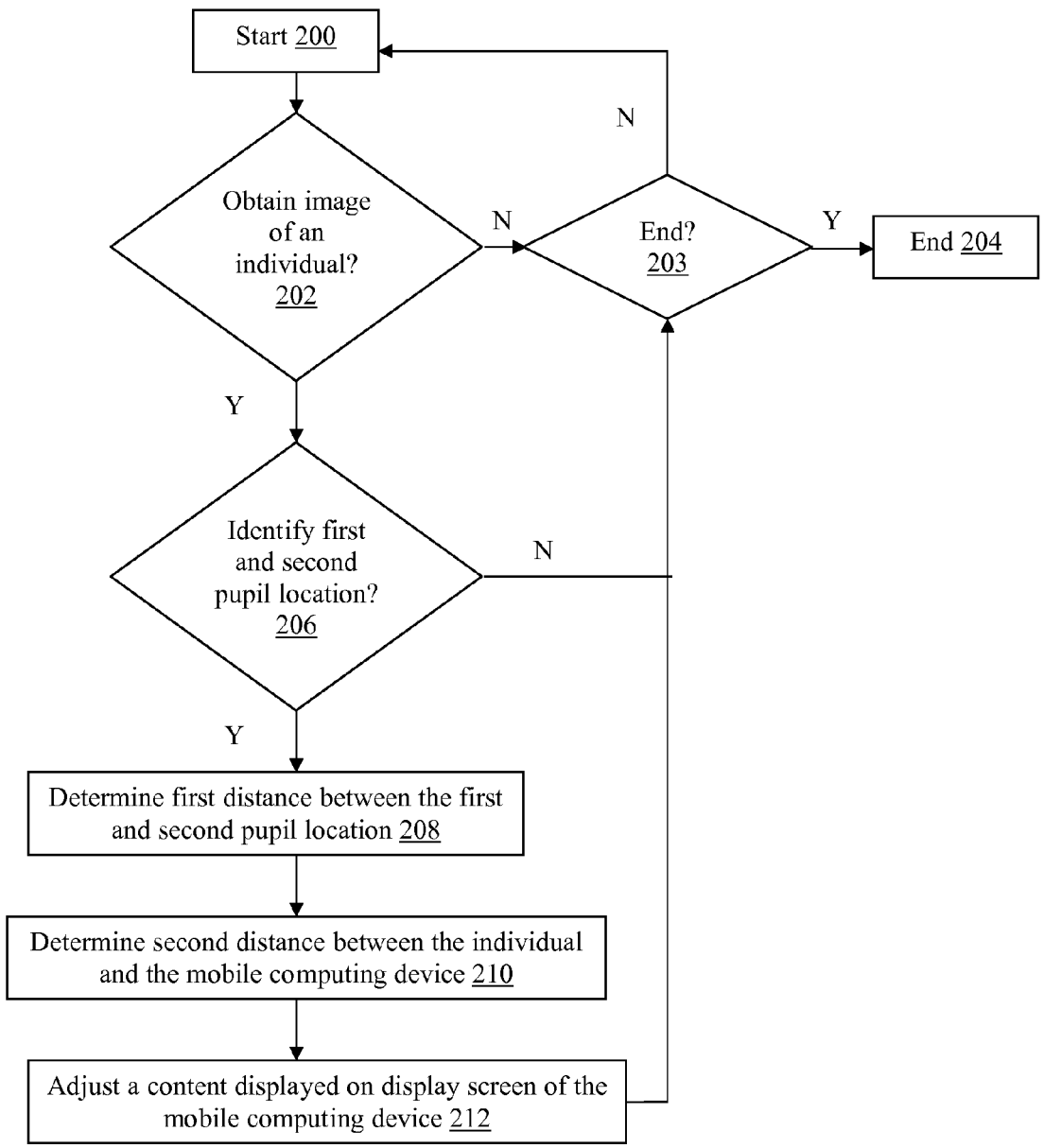
FIG. 3 is flow chart of a method for determining the viewing distance for a mobile computing device.

A method for determining a viewing distance for a mobile computing device 10 will now be described with reference to FIGS. 1-3. At step 200, the method for determining the viewing distance for the mobile computing device 10 may be initiated by the mobile computing device 10.

At step 202, the mobile computing device 12 may obtain an image of an individual utilizing the camera 20 of the mobile computing device 10. The camera 20 of the mobile computing device 10 may be oriented to obtain the image of the individual while the user views the display screen 18. If at step 202, an image is not obtained, then the No branch is taken to step 203.

At step 203, the mobile computing device 10 may determine whether to end the process. For example, the mobile computing device 10 may determine to end the process if the mobile computing device 10 is unable to obtain an image of the user after or stored period of time or if the mobile computing device 10 is inactive for a stored period of time, although other manners for ending the process may be used. If in step 203, the mobile computing device 10 determines to end the process, then the Yes branch is taken to step 204 where this method ends. If in step 203, the mobile computing device 10 determines not to end the process, then the No branch is taken back to step 200 where this process is again initiated as described earlier.

If back in step 202, the mobile computing device 10 determines that the camera 20 has obtained an image of an individual, then the Yes branch is taken to step 206. In step 206, the mobile computing device 10 may identify a first and second pupil location for the individual. If at step 206, the mobile computing device 10 is unable to identify a first and second pupil location for the individual in the obtained image then the No branch is taken to step 203.

At step 203, the mobile computing device 10 may determine whether to end the process. For example, the mobile computing device 10 may determine to end the process if the mobile computing device 10 is unable to identify a first and second pupil location if the mobile computing device 10 is inactive for a stored period of time, although other manners for ending the process may be used. If in step 203, the mobile computing device 10 determines to end the process, then the Yes branch is taken to step 204 where this method ends. If in step 203, the mobile computing device 10 determines not to end the process, then the No branch is taken back to step 200 where this process is again initiated as described earlier.

If back in step 206, the mobile computing device 16 identifies a first and second pupil location for an individual in the obtained image, then the Yes branch is taken to step 208. In step 208, the mobile computing device 10 determines a first distance between the first and second pupil locations. The first distance represents the apparent interpupilary distance between the first and second pupil location for the individual in the obtained image. The first distance may be expressed in the coordinates of the obtained image. For example, the first distance may be determined as a number of pixels in the obtained image.

At step 210, the mobile computing device 10 determines a second distance between the individual and the mobile computing device 10 based. The second distance between the individual and the mobile computing device 10 may be an approximate viewing distance for the individual relative to the display screen 18. The approximate viewing distance may be determined based on the interpupilary distance determined in step 208.

This technology provides various methods for determining the approximate viewing distance based on the interpupilary distance determined in step 208. In one example, the approximate viewing distance may be determined using the following formula:

$$\text{Viewing distance} = a/\max(\text{IAIPD}, b)$$

wherein the viewing distances is inversely proportional to the instantaneous apparent interpupilary distance (IAIPD) as measured in the obtained image, and a and b are positive constants. The constants a and b may be related to the specifications of the hardware, such as the resolution of the camera 20 of the mobile computing device 10, user demographics such as age or gender, and/or the specific application for which the viewing distance is to be determined. The parameters may be based on lab measurements and stored in the memory 14 of the mobile computing device 10. Alternatively, the parameters may be established for an individual user through an initial interactive set-up process. The interactive set-up process may include the mobile computing device 10 instructing the user to hold the mobile computing device 10 at various viewing distances, or instructing the user to obtain an image while holding an object the mobile computing device 10 may recognize the size of, such as a ruler, although other methods may be used to establish the parameters. The mobile computing device 10 may then use the information to establish parameters for constants a and b specific to the individual user.

In further examples, the approximate viewing distance may be determined in step 208 based on a stored a history of recently observed IAIPD measurements. The history of recently observed IAIPD values may be stored in the memory 14 of the mobile computing device 10. The number of recently observed IAIPD values stored in the history and the rate at which the IAIPD values are accumulated may depend on the particular requirements of the application for which the approximate viewing distance is being measured. By way of example only, the memory 14 of the mobile computing device 10 may store two arrays with 100 samples each. The recently observed IAIPD values may be stored on a first in-first out basis. The two arrays may store the recently observed IAIPD values at different rates. It is to be understood that other methods of storing the recently observed IAIPD values may be used.

The approximate viewing distance may then be determined based on the stored history of IAIPD values. In one example, the mobile computing device 10 may compare a determined IAIPD value obtained in step 208 to the stored history of IAIPD values. The approximate viewing distance may be computed as a fraction of recently observed IAIPD values that are below the current IAIPD value. For example, the mobile computing device 10 may determine, in step 210, that the approximate viewing distance is 0.0 where the current determined IAIPD is less than the smallest IAIPD value in the stored history. Similarly, the mobile computing device 10 may determine that the approximate viewing distance is 1.0 where the current determined IAIPD is greater than the largest value in the stored history and 0.5 where the current determined IAIPD is equal to the median value in the stored history.

In a further example, the approximate viewing distance may be determined based on the stored history of IAIPD values by fitting the stored history of IAIPD values to a parametric probabilistic model. The parametric probabilistic model provides a transformation between the IAIPD value determined in step 208 to the approximate viewing distance. The parametric probabilistic model may be a Gaussian probabilistic model or a complete generative geometric model, although other models may be used. The parameters of the model may be fit to the stored history of IAIPD values using a maximum likelihood method or the method of estimation maximization, although other methods of fitting the model parameters to the stored history of IAIPD values may be used. The fit parameters may then be used to transform the IAIPD value determined in step 208 to an approximate viewing distance using the model. This method may be adapted for specific applications designed to utilize the present invention. For example, prior distributions for model values or IAIPD values set by the designer of the application may be incorporated, although other methods of adapting the model to a specific application may be used.

It is to be understood that the methods for determining the approximate viewing distance in step 210 are non-limiting and non-exhaustive. Further, the various methods may be used alone or in combination as a series of backstops. For example, the mobile computing device 10 may store algorithms in the memory 14 for each of the methods. In the event that one method fails, the mobile computing device may fall back to another of the methods in order to determine the approximate viewing distance. Alternatively, the requirements of a particular application operating on the mobile computing device 10 may be used to determine which method for determining the approximate viewing distance may be used, although other methods of determining the method may be used.

Referring again to FIG. 3, at step 212, the mobile computing device adjusts a content displayed on the display screen 18 of the mobile computing device 10 based on the determined distance between the individual and the mobile computing device 10. The content may include text, video, graphics, pictures, and/or icons, although the content may include any other visual content capable of being displayed on the display screen 18 of the mobile computing device 10. By way of example only, the mobile computing device 10 may determine that the distance between the individual and the mobile computing device 10 is greater than the typical distance and adjust a content of the display screen 18 to appear larger for greater ease of viewing the content. The mobile computing device 10 may adjust the content based on the determined viewing distance for any desired application.

Accordingly, as illustrated and described with reference to the examples herein, this technology provides a number of advantages including providing effective methods and devices for determining a viewing distance for a mobile device. With this technology, a mobile computing device may determine the viewing distance based on a determined instantaneous apparent distance between the user's pupils in an image obtained by a user-facing camera of the mobile computing device. The instantaneous interpupilary distance may then be utilized to determine the viewing distance without explicit user calibration and/or a need to enter user-related information. The viewing distance may then be used to optimize display conditions and the user experience. Further, the technology is cost effective as it may be adapted to determine the viewing distance using the mobile computing device camera, which is already provided on many mobile devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
   obtaining, at a mobile computing device, an image of an individual;
   identifying, at the mobile computing device, a first pupil location and a second pupil location based on the obtained image;
   calculating at the mobile computing device, a current first distance between the first pupil location and the second pupil location;
   comparing, via the mobile computing device, the current first distance to a list of stored, previously measured first distances;
   determining, at the mobile computing device, a second distance between the individual and the mobile computing device based on what fraction of the stored, previously measured first distances fall below the current first distance.

2. The method of claim 1, further comprising:
   adjusting, at the mobile computing device, based on the second distance, a content displayed on a display screen of the mobile computing device.

3. The method of claim 1, wherein the determined second distance is 0.0 when the measured first distance is less than a smallest value in the stored history of measured first distance values.

4. The method of claim 1, wherein the determined second distance is 1.0 when the measured first distance is greater than a largest value in the stored history of measured first distance values.

5. The method of claim 1, wherein the determined second distance is 0.5 when the measured first distance is equal to a median value in the stored history of measured first distance values.

6. A non-transitory computer readable medium having stored thereon at least one instruction that when executed by a processor, is to cause the processor to:
   obtain an image of an individual;
   identify a first pupil location and a second pupil location based on the obtained image;
   calculate a current first distance between the first pupil location and the second pupil location;

compare the current first distance to a list of stored, previously measured first distances; and determine a second distance between the individual and the mobile computing device based on what fraction of the stored, previously measured first distances fall below the current first distance.

7. The non-transitory computer readable medium of claim 6, wherein the at least one instruction is to further cause the processor to:

adjust, based on the determined second distance, a content displayed on a display screen of the mobile computing device.

8. The non-transitory computer readable medium of claim 6, wherein the determined second distance is 0.0 when the measured first distance is less than a smallest value in the stored history of measured first distance values.

9. The non-transitory computer readable medium of claim 6, wherein the determined second distance is 1.0 when the measured first distance is greater than a largest value in the stored history of measured first distance values.

10. The non-transitory computer readable medium of claim 6, wherein the determined second distance is 0.5 when the measured first distance is equal to a median value in the stored history of measured first distance values.

11. An apparatus, comprising:

at least one processor; and a memory to store at least one instruction that when executed by the at least one processor, causes the at least one processor to:

obtain an image of an individual;

identify a first pupil location and a second pupil location based on the obtained image;

calculate a current first distance between the first pupil location and the second pupil location;

compare the current first distance to a list of stored, previously measured first distances; and determine a second distance between the individual and the mobile computing device based on what fraction of the stored, previously measured first distances fall below the current first distance.

12. The apparatus of claim 11, wherein the at least one instruction is to further cause the at least one processor to:

adjust, based on the determined second distance, a content displayed on a display screen of the mobile computing device.

13. The apparatus of claim 11, wherein the determined second distance is 0.0 when the measured first distance is less than a smallest value in the stored history of measured first distance values.

14. The apparatus of claim 11, wherein the determined second distance is 1.0 when the measured first distance is greater than a largest value in the stored history of measured first distance values.

15. The apparatus of claim 11, wherein the determined second distance is 0.5 when the measured first distance is equal to a median value in the stored history of measured first distance values.

* * * * *